Oct. 18, 1960  P. F. OLTON  2,956,482
AUTOMATIC VARIABLE COUNTERBALANCE
Filed Oct. 29, 1956
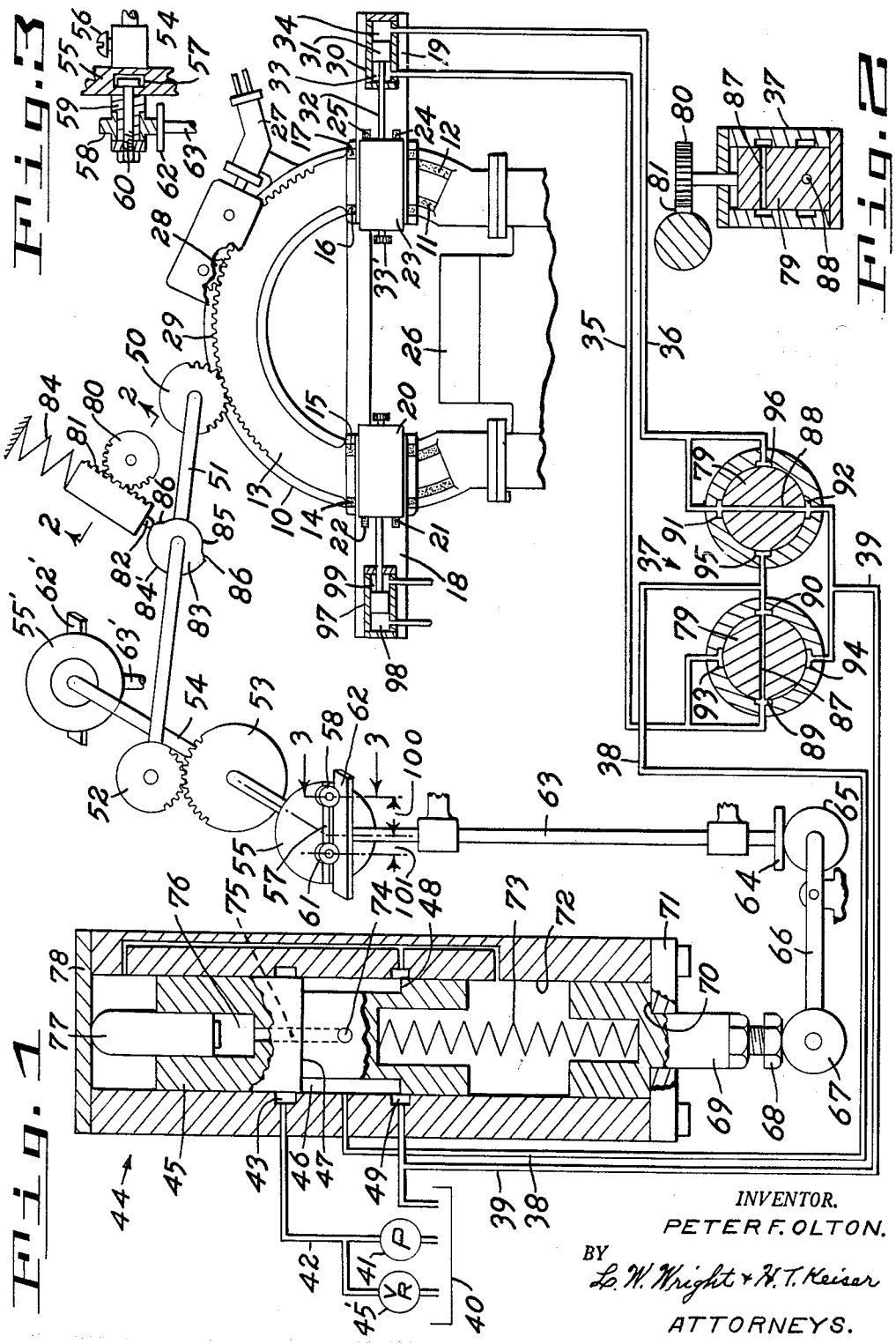
INVENTOR.
PETER F. OLTON.
BY
L. W. Wright & H. T. Keiser
ATTORNEYS.

United States Patent Office 2,956,482
Patented Oct. 18, 1960

2,956,482
AUTOMATIC VARIABLE COUNTERBALANCE

Peter F. Olton, Cincinnati, Ohio, assignor to The Cincinnati Milling Machine Co., Cincinnati, Ohio, a corporation of Ohio Filed Oct. 29, 1956, Ser. No. 618,761

6 Claims. (Cl. 90—17)

This invention relates to a new and improved automatically variable counterbalancing mechanism.

In the manufacture of machines having sliding members the support for said members may be angularly adjustable in a vertical plane. This means that if such an angularly adjustable support carries a sliding member which is movable in a horizontal plane for one position of the support, that upon adjustment of the support the guideways for the sliding member would become inclined whereby the attraction of gravity would become effective on the sliding member to create a force acting in the direction of the inclination of the guideways. Furthermore, the greater the inclination the greater the force acting to urge the sliding member downwardly.

One of the objects of this invention is to provide a variable counterbalance for a slide movable along a path which may have various acute angles of inclination with respect to a horizontal plane.

Another object of this invention is to provide a variable counterbalancing mechanism of the type described which is reversible in operation so as to be effective when the inclination changes from clockwise to counterclockwise or vice versa with respect to a horizontal plane.

A further object of this invention is to provide an automatic reversible counterbalancing mechanism which will apply a variable counterbalancing force automatically as the inclination of the path of movement increases or decreases with respect to zero inclination and positively or negatively with respect thereto.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a diagrammatic view of the entire counterbalancing control mechanism.

Figure 2 is a detail section on the line 2—2 of Figure 1.

Figure 3 is a detail section on the line 3—3 of Figure 1.

Referring to Figure 1 of the drawings, the reference numeral 10 indicates a basic member or support upon which is formed circular guideways 11 and 12, which lie in a substantially vertical plane. Upon these guideways is mounted an adjustable support member 13 which may be angularly moved or rotated on the guideways.

This adjustable support member has integrally formed on the face thereof two sets of vertical guideways, the first set being indicated by the reference numerals 14 and 15, and the second set being indicated by the reference numerals 16 and 17. A first saddle 18 is slidably mounted on the first set of guideways 14 and 15, and a second saddle 19 is slidably mounted on the guideways 16 and 17. The vertically movable saddle 18 is shown provided for illustrative purposes with a slide or spindle carrier 20 movable on guideways 21 and 22 formed on the saddle 18. A similar slide or tool carrier 23 is mounted on guideways 24 and 25 formed on the saddle 19.

It will now be seen from this illustrative set-up that if the support 13 is angularly adjusted that the guideways 21, 22, 24, and 25 will become angularly adjusted, and if the angular adjustment of the support 13 is in a counterclockwise direction, as viewed in Figure 1, there will be a gravitational urge on the spindle carrier 20 to move toward the left away from the central work support 26, and the carrier 23 will be urged toward the left toward the work support 26. If the adjustable support 13 is rotated clockwise, from the position shown, the gravitational urge on the two spindle carriers will be reversed. It is also to be noted that the greater the angle of inclination of the support guideways, the greater will be the gravitational force.

In accordance with this invention, means are provided for automatically producing counterbalancing forces to offset the gravitational forces caused by angular adjustments of the support 13 and to this end, means are provided for picking up angular changes in the position of the support 13 as they are made.

The particular means for adjusting the support 13 are not important to this invention but for illustrative purposes power operable means are shown in the form of a conventional hydraulic motor 27 which is operatively connected through gearing indicated generally by the reference numeral 28 to a circular rack 29 formed on the periphery of the adjustable support 13. The motor may, for instance, be a synchro motor adapted for remote control by the machine cycle control means.

The motor 27 may be suitably supported on the fixed support 10 whereby operation of the gearing 28 will cause the member 13 to be angularly adjusted.

In Figure 1, the guides 22 and 25 for the respective carriers 20 and 23 are shown in a horizontal position parallel to the surface of the work support 26. In this position of the parts, it is obvious that no counterbalancing forces are necessary for the spindle carriers. However, if the support 13 is adjusted counterclockwise a gravitational urge would be produced on the carriers 20 and 23 to move toward the left.

The saddle 19 for the carrier 23 has mounted thereon a counterbalancing cylinder 30, containing a piston 31 which is operatively connected by a piston rod 32 to the carrier 23. Other suitable means, not shown, may be provided for moving the carrier 23 in accordance with the cycle of operation of the machine to move the cutting tool 33′ operatively mounted on the tool carrier 23 toward and from any particular work mounted on the support 26. Such movements of the carrier 23 and its tool may be classed as machining movements, but whatever force is utilized to effect these movements, it must be great enough to not only move the slide 23 but also to overcome initially whatever pressure may exist in the opposite chambers 33 and 34 of the counterbalancing cylinder to start the movement. This does not affect the efficiency of the counterbalancing mechanism because the force produced in either the chamber 33 or 34 is only sufficient to overcome the gravitational urge or force on the carrier 23 and is not supposed to be great enough to produce independent movement of the carrier. Since pressure is only exerted in one chamber at a time, the end chambers 33 and 34 are connected by channels 35 and 36 to a reversing valve mechanism indicated generally by the reference numeral 37. By means of this valve, the channel 35 may be connected in one position of the valve to the pressure channel 38, while the channel 36 is connected to the exhaust or return channel 39. It will be noted that the channel 39 is indicated as a return line to the reservoir 40 from which fluid is withdrawn by the pump 41 and delivered through channel 42 to the port 43 of a pressure control valve indicated generally by the reference numeral 44. The channel 42 may have a relief valve 45' connected thereto for regulating the pressure at port 43 of the control valve. In the other position of the reversing valve, the connections are reversed.

The control valve 44 has a siding valve plunger 45, and the position of this plunger in the valve housing determines the pressure to be delivered to the channel 38, or, in other words, the counterbalancing pressure. This is accomplished by providing the valve plunger with an annular groove 46 which is of such a length that when the valve plunger is in a position that the shoulder 47 of the groove 46 partially closes the port 43, and a second shoulder 48 of the groove 46 partially closes an exhaust port 49, the pressure in the groove 46 will be substantially one-half of the pressure in the pump supply line 42. In other words, when the resistance to flow into the groove through the port 43 is equal to the resistance to the flow of fluid out of the groove at port 49 the pressure in the groove will be substantially one-half of the supply pressure. This makes it possible to move the valve plunger up or down to increase or decrease the pressure in channel 38. Thus, if the valve plunger is moved downward sufficient to close the port 43, the pressure in the groove 46 will be reduced substantially to zero, and thus there will be no pressure in the channel 38 and chamber 33. Furthermore, since the chamber 34 and channel 36 are connected to the reservoir channel 39, there will be substantially no pressure in the chamber 34. Thus, when the slides 20 and 23 are in a horizontal position, the valve plunger 45 can be positioned to produce no appreciable counterbalancing forces acting on the slides.

When the slide 13 is angularly adjusted, it will cause actuation of a pick-up mechanism including a gear 50 which is diagrammatically illustrated in mesh with the circular rack 29 to effect automatic adjustment of the control valve 44. This gear is mounted on a suitable shaft 51 which carries a second gear 52 in mesh with a gear 53 mounted on a shaft 54. Thus, any rotation of the gear 50 will produce rotation of shaft 54 and valve operator 55 mounted on the shaft 54. The valve operator 55 is suitably secured to the end of the shaft 54, as by a set screw 56, and is provided on its face with a T slot 57. Mounted in the T slot are suitable rollers 58 journaled on a stud 59 which is clamped to the operator 55 by suitable T bolts 60. The rollers 58 and 61, shown in Figure 1, engage a cross piece 62 mounted on the end of a rod 63. This rod carries a disc 64 on its other end for engaging a roller 65 mounted on the end of a rocker lever arm 66. At its other end, the rocker arm carries a roller 67 engaging an adjustable screw 68 threaded in the end of a plunger 69.

It will be noted that the plunger 69 has a shoulder 70 abutting the end of the cap member 71 of valve 44 and is slidable in the same bore 72 of the valve housing in which the valve plunger 45 is slidable. A spring 73 is interposed between the plunger 69 and the valve member 45, thereby creating a separating force between the two parts. The valve member 45, however, has interdrilling comprising a cross bore 74 which intersects an axial bore 75 formed in the plunger and terminating in a larger bore 76 formed in the end of the valve member 45 and containing a piston member 77. It will be obvious that when pressure exists in the annular groove 46 that it will be transmitted through the interdrilling 74 and 75 to the bore 76 and thereby exert an outward force on the plunger 77. The piston or plunger 77 engages the end 78 of the valve 44, thereby producing a reactive force to urge the plunger 45 toward the plunger 69 against the resistance of the spring 73.

With this explanation of the above principles of the invention the specific manner of operation will now be explained. When the spindle carriers are in a horizontal position no counterbalancing forces are necessary, and so no pressure is needed in the counterbalancing cylinders. This result is attained by arranging the parts of the mechanism in the starting or null position with the rollers 58 and 61 of the valve actuator both in contact with the plate 62. This means that when the shaft 54 is rotated in either direction the rod 63 will be moved in only one direction and that is downward as viewed in Figure 1.

The adjusting screw 68 on the end of the plunger 69 is so adjusted and locked that the plunger 69 is all the way down in contact with the end plate 71 and with the member 68 in contact with the roller 67, thus holding the plate 62 in contact with both of the rollers 58 and 61. Thus, any rotation of the shaft 54 in one direction or the other will cause upward movement of the plunger 69 from its extreme lower position.

The spring 73 is made of such length that when resting on the plunger 69 in its expanded or free condition it will support the valve plunger 45 in such axial position that the supply port 43 will be closed and the exhaust port 49 will be open. Of course, with the system full of oil or fluid from previous operations, a slight leakage from the pressure port 43 into the annular groove 46 will cause the whole system to be under a very small pressure which is an advantage in keeping air out of the system and having it in condition for immediate response to changing conditions. In this position of the parts it will be noted that the channel 38 will be directly connected to the exhaust port 49, and so no appreciable pressure will exist in the counterbalancing cylinder 30.

It will now be seen that when the member 13 is angularly adjusted in either direction the resultant effect will be upward movement of the plunger 69 and thereby through spring 73, upward movement of the plunger 45, causing simultaneously a closing of the exhaust port 49 and an opening of the pressure port 43, thus causing an increase in pressure in the groove 46. This change in pressure will be immediately transmitted through the channel 38 to the cylinder 30 and thus create a counterbalancing force on the piston 31. It will be obvious that the greater the angular movement of the member 13, the greater will be the counterbalancing pressure.

Attention is now directed to the function of the piston 77 slidable in the bore 76 of the valve 45. This piston is acted upon by whatever pressure exists in the groove 46 of the valve and, as just explained, this pressure increases as the valve plunger moves up. Therefore, the downward thrust on the valve plunger 45 created by the reaction of the pressure in the bore 76 between the plunger 77 and the valve plunger 45 increases as the plunger moves up, but the resistance of the spring 73 increases as it becomes more compressed with the result that an equilibrium condition is attained in which the valve plunger is held between two opposing forces in its various positions.

As previously noted, the spindle carrier 23 may be moved or adjusted back and forth by suitable conventional means not shown and any such movement will cause movement of the piston 31. Since pressure only exists in one chamber at a given time, this movement will be in a direction to either increase or decrease the pressure in the chamber which happens to be under pressure. This increase or decrease in pressure will eventually be communicated to the bore 76 and thereby cause movement of the plunger 45 independent of the pick-up valve actuating mechanism and thus open or close the exhaust port 49 to increase or decrease the pressure in channel 38 and thus permit movement of the carrier to take place without appreciable interference from the counterbalancing pressure.

From this it will be seen that the function of the piston 77 and bore 76 is to act as a means for causing a limited exhaust of fluid from the counterbalancing side of the piston 31 or an addition thereto to permit necessary movement thereof without appreciably disturbing the hydraulic counterbalancing force acting thereon and that this is done while the valve actuating mechanism included between the rack 29 and the plunger 69 remains stationary.

When the support 13 is adjusted counterclockwise from the horizontal position shown, the counterbalancing pressure is put in chamber 33 of the counterbalancing cylinder 30, for example, but when the member 13 is adjusted clockwise from the horizontal position it is necessary to put the counterbalancing pressure in chamber 34. In other words, the pressure line 38 should then be connected to channel 36. This is accomplished automatically by providing the reversing valve 37. This valve has a rotatable valve stem 79 as shown in Figure 2 which is provided with a gear 80 for imparting rotation thereto.

As shown in Figure 1, the gear 80 meshes with a rack 81 which carries a follower finger 82 adapted to engage the periphery of a cam 83 mounted on the shaft 51. The finger 82 is maintained in engagement with the periphery of the cam by the impetus of a spring 84. The cam 83 has a high portion 84' and a low portion 85, both portions extending substantially 180 degrees and being connected by suitable inclined portions 86.

The difference in the radial dimension of these portions is sufficient to move the rack the distance necessary to impart 90 degree rotation to the valve stem 79.

The valve stem has two cross bores 87 and 88 formed therein but at right angles to each other and displaced axially of the valve stem. As shown in Figure 1, the cross bore 87 is in a position to interconnect ports 89 and 90 whereby the pressure channel 38 is connected to the channel 35. At the same time, the cross bore 88 interconnects ports 91 and 92 whereby the channel 36 is connected to the exhaust line 39. Upon rotation of the valve stem through an angle of 90 degrees in either direction the cross bore 87 will interconnect ports 93 and 94 whereby the channel 35 will now be connected to the exhaust line 39; and the bore 88 will interconnect ports 95 and 96 whereby the pressure channel 38 will now be connected to channel 36. It will now be evident that whenever the shaft 51 is rotated as a result of angular movement of the slide 13 that the reversing valve will be positioned to connect the pressure line 38 to the pressure end of the counterbalancing cylinder 30 in the proper relation in accordance with the direction of rotation of the member 13.

Where two tool carriers are provided on the member 13 in opposite relation as shown in Figure 1, a second counterbalancing cylinder 97 may be provided for the carrier 20 and connected by a second reversing valve, like the valve 37, to a second counterbalancing control valve such as the valve 44 and such a valve may be controlled by the valve actuator 55' mounted on the shaft 54. Thus, both counterbalancing control valves can be controlled from the common shaft 54. Of course, it will be obvious that when a counterbalancing pressure is supplied to the chamber 33 of the cylinder 30 that the counterbalancing pressure will be supplied to the chamber 98, and when the counterbalancing pressure is connected to the chamber 34 of cylinder 30 the counterbalancing pressure would be connected to the chamber 99 of cylinder 97.

Attention is invited to the rollers 58 and 61 on the valve actuator 55. It will be noted that these rollers are radially adjustable, and, of course, the greater the radius of the roller, the more it will move the rod 63 for the same angular movement of the shaft 54. Since the counterbalancing pistons, such as 31, are differential pistons, with the area on one side greater than the area on the other side, different pressures have to be used to produce the same counterbalancing. This is obtained by differentially adjusting the rollers 58 and 61 with respect to center; in other words, the distance 100 is made different than the distance 101.

There has thus been provided an improved counterbalancing mechanism for an angularly adjustable support which will counterbalance slides mounted thereon automatically in accordance with the direction of rotation of the main support and which is automatically releasable to the extent necessary to permit power movement of the slides without interfering with the control mechanism.

What is claimed is:

1. A counterbalancing mechanism for a slide movable along guideways having varying angles of inclination operable to prevent movement of the slide along the guideways due to the force of gravity and to permit machining movements of the slide along said guideways comprising a cylinder member having a piston member slidably received therein, one of said members being fixed in relation to the guideways and the other being connected to the slide, a source of pressure, a valve having a channel opening, a pressure port connected to said source of pressure, and an exhaust port, a valve plunger slidably received within the valve, means integral with the valve plunger to connect the pressure port to the channel opening and to increase the size of the pressure port as the plunger moves in one direction and to decrease the size of the exhaust port in connection with the channel opening as the valve plunger moves in said one direction, means responsive to an increasing angular inclination of the guideways to urge the valve plunger in said one direction and thereby increase the pressure available at the channel opening, means responsive to the pressure available at the channel opening to urge the valve plunger in the opposite direction, and means responsive to the direction of inclination of the guideways alternately to connect the channel opening in the valve to one end of the cylinder and the opposite end of the cylinder.

2. A counterbalancing mechanism for a slide movable along guideways having varying angles of inclination operable to prevent movement of the slide along the guideways due to the force of gravity and to permit machining movements of the slide along said guideways comprising a cylinder member having a piston member slidably received therein, one of said members being fixed in relation to the guideways and the other being connected to the slide, a source of pressure, a valve having a channel opening, a pressure port connected to said source of pressure, and an exhaust port, a valve plunger slidably received within the valve, means defined by the valve plunger to connect the pressure port and the channel opening and increase the size of the pressure port as the valve plunger moves in one direction and connect the channel opening and the exhaust port and decrease the size of the exhaust port as the valve plunger moves in said one direction, a second plunger slidably received within the valve, means to urge the two plungers apart, means responsive to an increase in the angular inclination of the guideways in either direction to move the second plunger and thereby urge the first plunger in said one direction to increase the pressure available at the channel opening, means responsive to the increased pressure at the channel opening to urge the first plunger in the direction opposite to said one direction, and means responsive to the direction of inclination of the guideways alternately to connect the channel opening in the valve to one end of the cylinder and the opposite end of the cylinder.

3. A counterbalancing mechanism for a slide movable along guideways having varying angles of inclination operable to prevent movement of the slide along the guideways due to the force of gravity and to permit machining movement of the slide along said guideways comprising a cylinder member having a piston member slidably received therein, one of said members being fixed in relation to the guideways and the other being connected to the slide, a source of pressure, a valve having a channel opening, a pressure port connected to said source of pressure, and an exhaust port, a valve plunger having a slidable piston therein, said plunger having a groove and being movable in the valve to connect the channel opening to the pressure port and increase the size of the pressure port as the plunger moves in one direction and connect the channel opening to the exhaust port and decrease the size of the exhaust port as the plunger moves in said one direction, means within the valve to arrest movement of the piston out of said plunger, a second plunger slidably received within the valve, a spring interposed between the plungers to urge the plungers apart, means responsive to an increase in the angular inclination of the guideways in either direction to move the second plunger and thereby urge the first plunger in said one direction, means responsive to the pressure at the channel opening to urge the plunger piston out of the plunger and against the arresting means to urge the plunger in the direction opposite to said one direction, and means responsive to the direction of inclination of the guideways alternately to connect the channel opening in the valve to one end of the cylinder and the opposite end of the cylinder.

4. In a machine tool, the combination comprising: guideways adapted to receive a slide; means to incline said guideways at varying angles of inclination; a slide adapted to carry a cutting tool slidably carried on said guideways and subjected to a gravitational component of force along said guideways varying as the angle of inclination varies; a cylinder fixed in relation to the guideways; a piston slidably received within the cylinder and connected to the slide; a source of pressure; a valve having a channel opening, a pressure port connected to said source of pressure, and an exhaust port; a valve plunger having a bore with a slidable piston therein, said plunger having a groove and being movable in the valve to connect the channel opening to the pressure port and increase the size of the pressure port as the plunger moves in one direction and connect the channel opening to the exhaust port and decrease the size of the exhaust port as the plunger moves in said one direction; means within the valve to arrest movement of the piston out of said plunger; a second plunger slidably received within the valve; a spring interposed between the plungers to urge the plungers apart; means responsive to the angular inclination of the guideways in either direction to move the second plunger a distance proportional to the gravitational component of force acting along said slide incident to said inclination and thereby urge the first plunger in said one direction; a passage in the first valve plunger connecting the channel opening to the bore in said plunger whereby the pressure at the channel opening is communicated to the bore to urge the piston against the arresting means and urge the plunger in the direction opposite to said one direction; and a valve operable in response to the direction of inclination of the guideways alternately to connect the channel opening in the valve to one end of the cylinder and the opposite end of the cylinder.

5. In a machine tool having a slide mounted on straight guideways, means connecting said guideways to a support, and means to angularly adjust said support and thereby incline said guideways at selected angles to the horizontal plane causing a gravitational force component on said slide along said guideways varying in accordance with the angle at which the guideways are inclined, the combination of means to counterbalance said force component including a chamber fixed relative to the guideways containing a piston connected to said slide, means to supply fluid under pressure to one end of said chamber to oppose movement of the piston by said force component on the slide, valve means including a movable valve member for varying the pressure of the supplied fluid, and means to position said valve member in accordance with the angle at which the guideways are inclined.

6. In a machine tool having a slide mounted on straight guideways, means connecting said guideways to a support, means to rotate said support in one direction and thereby incline said guideways at selected angles to the horizontal plane causing a gravitational force component on said slide along said guideways varying in accordance with the angle at which the guideways are inclined, means to rotate said support in the opposite direction thereby causing a gravitational force component on said slide acting along said guideways in the opposite direction to the gravitational force component acting on the slide when the support in rotated in said one direction, a counterbalancing cylinder fixed relative to said guideways and having a piston connected to said slide, means to supply fluid under pressure to said cylinder, a first valve having a movable member for varying the pressure of the supplied fluid, motion transmitting means connecting the movable member of the first valve to the support for positioning said member in accordance with the amount of rotation of the support, a second valve having a movable member for directing the fluid to one side or the other of said piston in the cylinder, and motion transmitting means connecting the movable member of the second valve to the support for positioning said member in accordance with the direction of rotation of the support.

References Cited in the file of this patent
UNITED STATES PATENTS

| | | |
|---|---|---|
| 1,510,167 | Wilhelm | Sept. 30, 1924 |
| 2,513,486 | Herman | July 4, 1950 |
| 2,759,378 | Youssoufian et al. | Aug. 12, 1956 |
| 2,830,502 | Van DeWater | Apr. 15, 1958 |